(12) United States Patent
Manchester

(10) Patent No.: US 7,688,466 B2
(45) Date of Patent: Mar. 30, 2010

(54) SMART DISPLAY PRINTER

(75) Inventor: Scott A. Manchester, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1100 days.

(21) Appl. No.: 11/340,118

(22) Filed: Jan. 26, 2006

(65) Prior Publication Data
US 2007/0171436 A1    Jul. 26, 2007

(51) Int. Cl.
*G06F 3/12*     (2006.01)
*G06F 15/16*    (2006.01)

(52) U.S. Cl. .................. 358/1.15; 358/1.16; 709/202; 709/203; 709/216; 709/219

(58) Field of Classification Search ....... 358/1.12–1.16; 709/202, 203, 216, 219
See application file for complete search history.

(56) References Cited

U.S. PATENT DOCUMENTS

| | | | |
|---|---|---|---|
| 6,120,127 A * | 9/2000 | Inoue et al. .................. 347/37 |
| 6,757,071 B1 | 6/2004 | Goodman et al. |
| 6,823,147 B2 | 11/2004 | Jackelen et al. |
| 6,842,262 B1 | 1/2005 | Gillihan et al. |
| 6,914,698 B1 | 7/2005 | Hunter |
| 2003/0044009 A1 | 3/2003 | Dathathraya |
| 2003/0099353 A1 | 5/2003 | Goh et al. |
| 2003/0160816 A1 * | 8/2003 | Zoller et al. ................. 345/735 |
| 2005/0068570 A1 | 3/2005 | Hart et al. |
| 2005/0181337 A1 * | 8/2005 | Shaw ......................... 434/219 |
| 2005/0197967 A1 | 9/2005 | Booth et al. |
| 2005/0240773 A1 * | 10/2005 | Hilbert et al. ............... 713/182 |

FOREIGN PATENT DOCUMENTS

EP        1 182 860 A3    3/2004

OTHER PUBLICATIONS http://www.ericom.com/story_batteriesplus.asp.
http://h71028.www7.hp.com/enterprise/downloads/Capgemini%20MPS%20(A4).pdf.
http://www.lexmark.com/uncomplicate/sequentialem/home/0,7070,241429423_481478192_0_en,00.html.

* cited by examiner

*Primary Examiner*—Chan S Park
(74) *Attorney, Agent, or Firm*—Marshall, Gerstein & Borun LLP

(57) ABSTRACT

A printer display which allows users to access and edit a document may resolve some problems traditionally associated with the publication process on network printers. This may be accomplished by providing a GUI at the printer at which a user may access, display, and edit a document originally saved to the user's PC. The GUI may allow users to make changes to the document while they are present at the network printer instead of forcing them to return to their PC to make the changes. Additionally, restricting access to the printer display may provide a secure printing environment for the user by controlling who may access a document at the printer or view printed results. Further, limiting GUI and document access may also reduce or eliminate the potential for lost or stolen printed documents.

20 Claims, 10 Drawing Sheets

SMART DISPLAY PRINTER

BACKGROUND

Documents often require many revisions before they are ready for final publication. In many home and business environments, a writer will edit his document at a personal computer (PC) and print the document to a remotely-located, network printer. The writer must then travel to the printer to retrieve the printed document or have the document delivered to his location. During the revision process, the writer will often print what he thinks is the publication copy of a document only to find minor errors that are visible once it is in tangible form. For example, documents with headers and footers are often edited such that these parts of the document are not visible until printing. If the printed document contains header and footer formatting errors, the writer must first travel to the printer to retrieve the printed document, notice the errors, travel back to his PC to correct those errors, print the document again, then travel back to the printer to retrieve the corrected, printed document. Correcting these minor errors wastes both time and resources. Furthermore, once the writer sends his document to a conventional shared network printer, the printer prints that document as soon as the file has made its way through the printer queue. Consequently, others may be able to view or gain possession of the printed document before the writer has a chance to retrieve it.

Previous methods and devices have included graphical user interfaces (GUIs) at the printer, but none have addressed the particular problem associated with the publication process and security nor have they enhanced the tedious, back-and-forth revision process described above. For example, printers are known to allow a user to first print a reduced version of image files associated with digital imaging to prevent printing full-sized copies of unwanted photos. Other devices include printing interfaces which allow a user to apply formatting changes to a portion of a document without changing the original file and to print a copy with those changes. Further printers will display information about mismatches between a printer's resources and the file in a user interface or allow manual or automatic changes to a document based the compatibility of the document content with printer resources. Still other references disclose methods for secure printing which employ data encryption/decryption techniques and the use of SMART cards.

SUMMARY

A printer display 200 which allows users to access and edit a document 430 may resolve some problems traditionally associated with the publication process. This may be accomplished by providing a GUI 200 at the printer 196 at which a user may access, display, and edit a document 430 originally saved to the user's PC 110. The GUI 200 may allow users to make changes to the document 430 while they are present at the printer 196 instead of forcing them to return to their PC 110 to make the changes. Additionally, restricting access to the printer display 200 may provide a secure printing environment for the user by controlling who may access a document 430 at the printer 196 or view printed results. Further, limiting GUI 200 and document 430 access may also reduce or eliminate the potential for lost or stolen printed documents.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
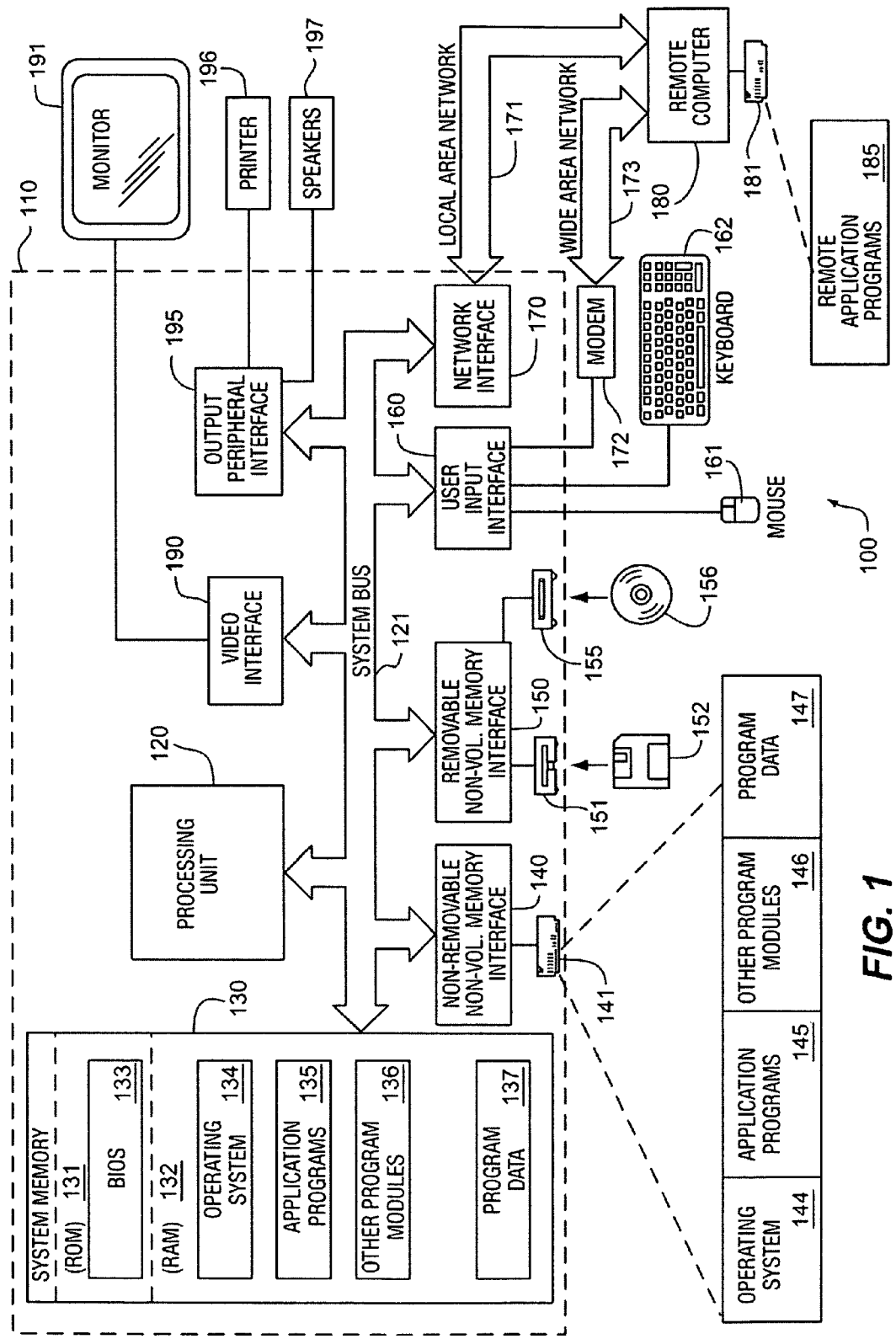
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation of the scope of use or functionality of the claimed method or apparatus. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc., that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer or PC 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190. Additionally, the printer 196 may be connected via the network interface 170.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Generally, and with reference to FIGS. 2 through 10b, the present invention embodies a method and apparatus to allow for editing and printing a document through a printer GUI. More specifically, on a printer 196, the method and apparatus may allow a user to access a document originally stored on a remote PC using the access functions of a printer GUI 200. This access may permit the user to have complete control of the editing and printing process while physically located at the printer. With reference to FIGS. 2a and 2b, a sample printer 196 of the type envisioned by this apparatus may include a user interface area 210 which includes a printer GUI 200. In one embodiment illustrated in FIG. 2a, the printer GUI 200 may allow a user to make any changes to a document by using only a stylus 220. In this embodiment, the user may make all or some corrections on the displayed document 430 with the stylus 220, and appropriate handwriting recognition software may make the changes to the text of the document 430 before printing. In another embodiment of FIG. 2b, the user makes all changes using a conventional keyboard 230 and a fixed pointing device 240. Further, the printer GUI 200 may be a rich, color user interface which allows all desktop PC 110 functionality from the printer 196. For example, the printer GUI 200 may be used to access video conferencing applications ahead of meetings where crucial documents are currently being printed by the printer 196 to tell meeting attendees of any delays or an estimated time for completed document delivery. Further, the printer GUI 200 could warn the user of device malfunctions and provide interactive videos at the printer 196 to guide the user to resolve the problem. Also, a user could perform personal tasks by accessing his desktop PC 110 from the printer GUI 200 such as sending e-mails, checking task calendars, or updating individual or project tasks as soon as the print job is complete. The printer GUI 200 may also be multi-functional according to the capabilities of the underlying printer 196 for all document processing tasks.

Figure 3:
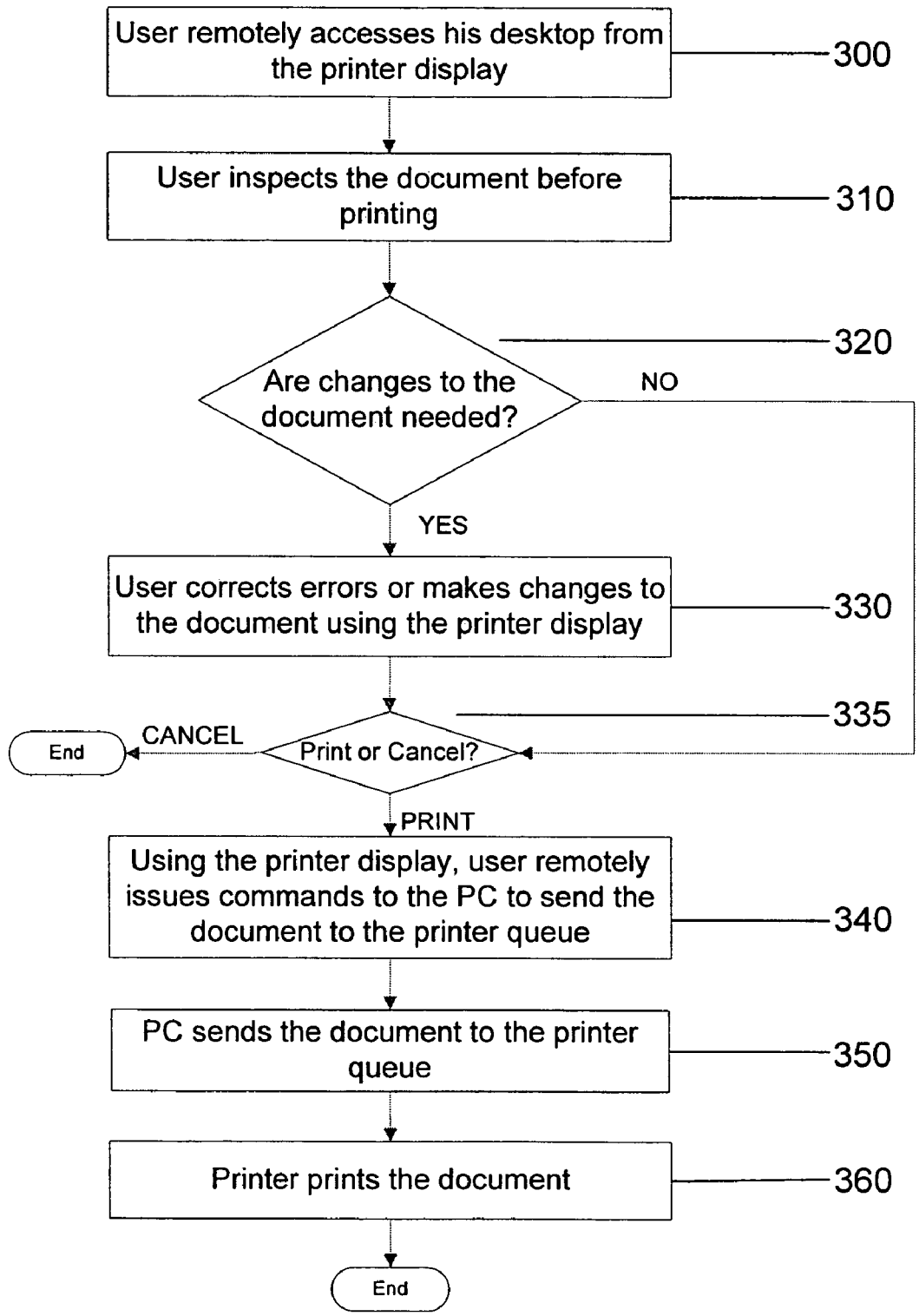
FIG. 3 is a flowchart explaining an embodiment of a control process for printing a document using the printer display.
Figure 4A:
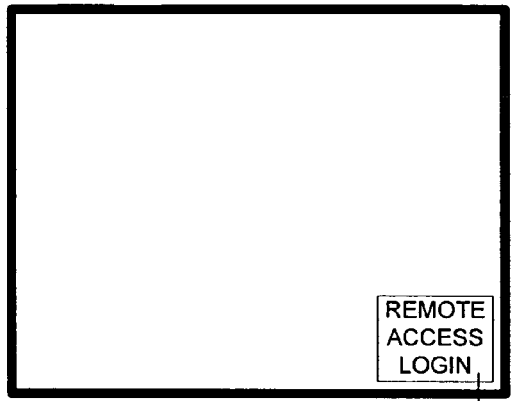
FIGS. 4a through 4d illustrate the control process of FIG. 3 as seen from a user's perspective.
Figure 4B:

With reference to FIGS. 3 and 4a through 4d, a user may remotely access a document saved on a PC 110 from the printer 196, make any desired changes to the document while at the printer 196, and print the document. FIG. 3 may illustrate one process using the invention. At block 300, the user may remotely access a PC 110 using the printer GUI 200 at the printer 196. FIG. 4a may illustrate an example of a printer GUI 200 with a Remote Access Login button 500 which, upon activation, may allow the user to remotely access a desktop. The printer GUI 200 of FIGS. 4a through 4d is for illustration purposes only and may display additional information concerning the printer or a particular print job in addition to the Remote Access Login button 400. Also, a Remote Access Login 400 initiated from the printer GUI 200 may include a number of authentication steps to restrict access to a user's desktop, thus enhancing the security of each print job.

Figure 4C:
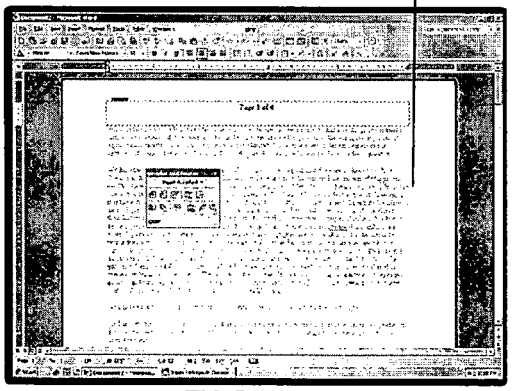
Figure 4D:
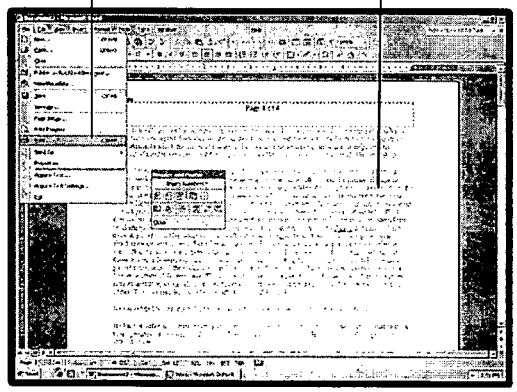
Figure 5:
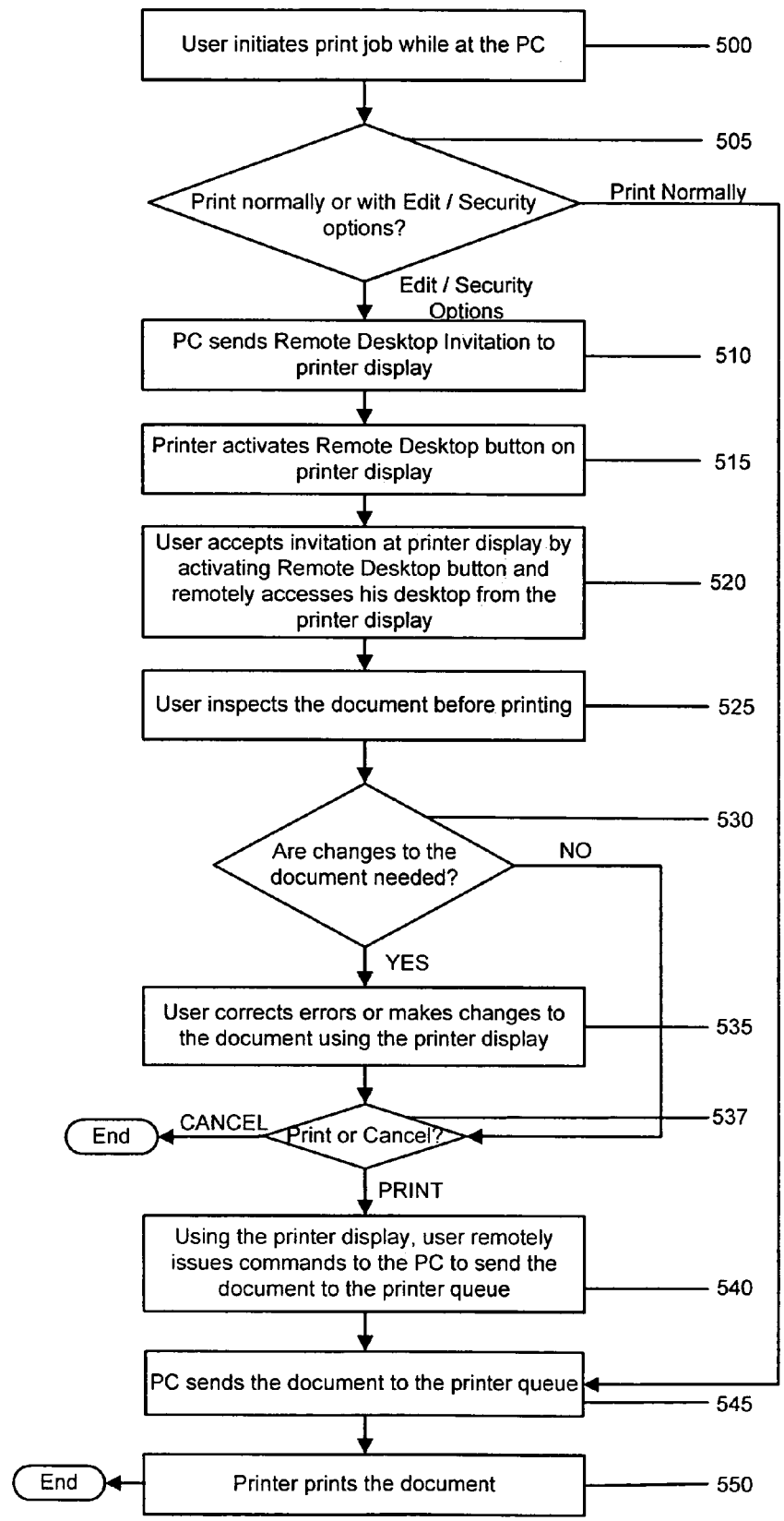
FIG. 5 is a flowchart explaining another embodiment of a control process for printing a document using the printer display.

Assuming the user has completed remote access login, the printer GUI 200 may display that user's PC 110 desktop 410. Using an input device such as the stylus 220, keyboard 230, or a fixed pointing device 240 or the like, the user may then find the icon 420 representing his document 430 to view it on the printer GUI 200. At block 310, the document 430 may be displayed on the printer GUI 200 and the user may inspect it for any further editing or last minute changes 310. For example, as illustrated in FIG. 4c, the user may recognize that page numbers were not included in the header portion of his document 430. At block 320, upon recognition of the error, the user may decide whether document changes are needed. If the decision at block 320 is yes, at block 330, the user may correct the errors using the printer GUI 200, and control may pass to block 335. At block 335, the user may then decide whether to print or cancel the job. If the decision at block 320 is no, at block 335 the user may choose to print the document 430. At block 340, the user may remotely issue commands to the PC 110 to send the document 430 to the printer queue 440. At block 350, the PC 110 may then send the document 430 to the printer queue. At block 360, the document may be delivered through the queue and may be received by the printer 196 where the printer 196 may transfer the document 430 onto a tangible medium as desired by the user.

Figure 6A:
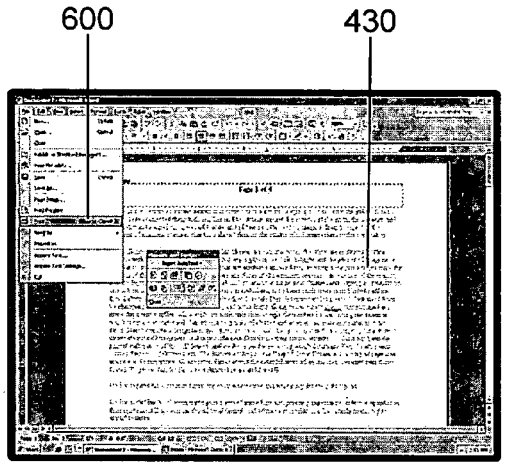
FIGS. 6a through 6e illustrate the control process of FIG. 5 as seen from a user's perspective.

FIGS. 5 and 6a through 6f may illustrate another embodiment for accessing and printing a document from a printer display. At block 500, as illustrated in FIG. 6a, the user at the PC 110 may send a print job to the printer 196 by selecting a print option 600. At block 505, through a prompt generated by an application running on the PC or through default settings, the user may decide to activate the printer GUI 200 for editing or security functions. The user's response may determine whether or not a remote desktop invitation is sent from the PC 110 to the printer 196.

Figure 6B:
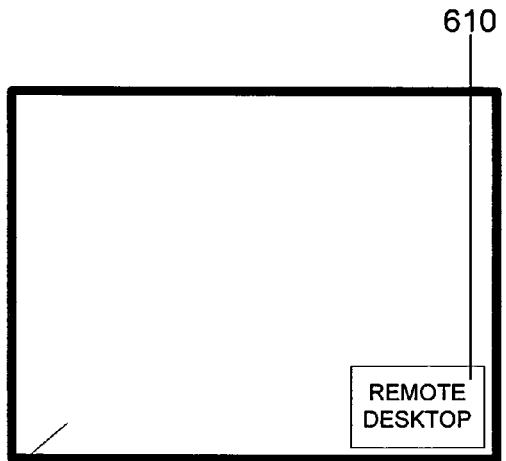
Figure 6C:
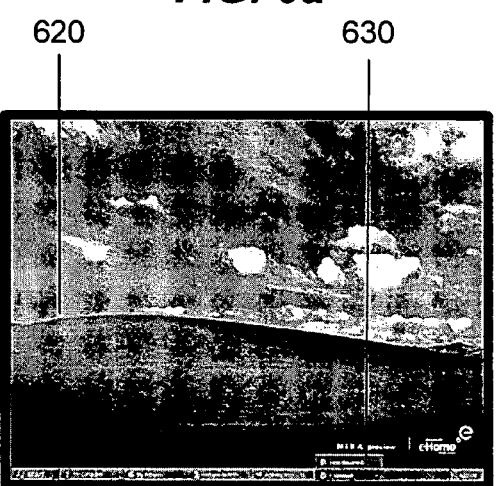
Figure 6D:
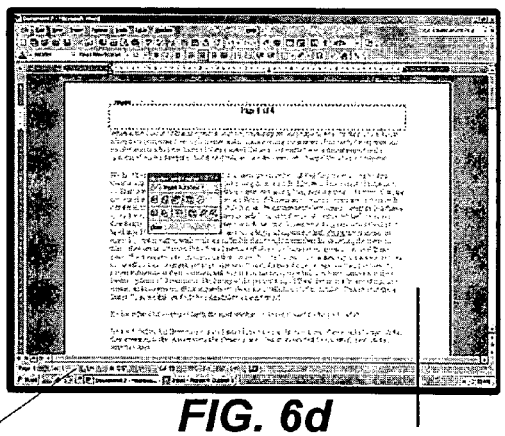
Figure 6E:
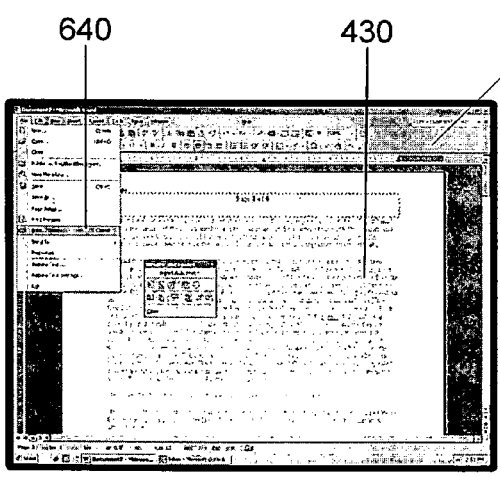
Figure 6F:
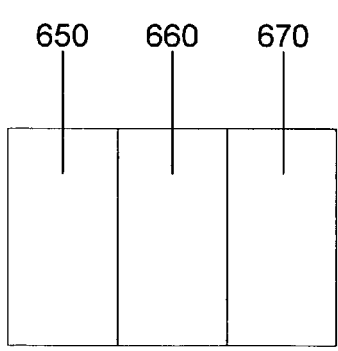
FIG. 6f illustrates an embodiment of a remote desktop invitation.

FIG. 6f illustrates an embodiment of a remote desktop invitation. A remote desktop invitation is a file associated with a print job that is sent from the PC 110 to the printer 196. This file may contain the IP address 650 and Netbios machine name 660 of the originating PC 110. Also, the remote desktop invitation may include a reference, data file, or other representation 670 of the document 430. The remote desktop invitation may provide the information necessary for the printer GUI 200 to remotely access the PC 110 that initiated the print control process. Further, a remote desktop invitation may allow the user to remotely access the PC 110 from the printer GUI 200.

If the decision at block 505 is yes, at block 510 the document 430 may be printed with edit/security options, and the PC may send a remote desktop invitation to the printer GUI 200. At block 515, as illustrated in FIG. 6b, if the printer receives a remote desktop invitation, then a user may activate the Remote Desktop button 610 on the printer GUI 200 to remotely access the PC 110 and retrieve a document 430 saved on a PC 110. The printer GUI 200 of FIG. 6a through 6e is for illustration purposes only and may display additional information concerning the printer or a particular print job in addition to the Remote Desktop button 610. Also, a Remote Access 610 initiated from the printer GUI 200 may include a number of authentication steps to restrict access to a user's desktop, thus enhancing the security of each print job.

At block 520, the user may accept the remote desktop invitation at the printer GUI 200 by activating the Remote Desktop button 610 and may access his PC 110 desktop 620 from the printer GUI 200. Using an input device such as the stylus 220, keyboard 230, or a fixed pointing device 240 or the like, the user may then find the icon 630 representing his document 430 to view it on the printer GUI 200. At block 525, the document 430 may be displayed on the printer GUI 200 and the user may inspect it for any further editing or last minute changes. For example, as illustrated in FIG. 6d, the user may recognize that page numbers were not included in the header portion of his document 430. At block 530, upon recognition of the error, the user may decide that document changes are needed and, at block 535, correct the errors using the printer GUI 200. As shown in FIG. 6e, at block 540, the user may remotely issue commands 640 to the PC 110 to send the document 430 to the printer queue. At block 545, the PC 110 may then send the document 430 to the printer queue. At block 550, the document may be delivered through the queue and may be received by the printer 196 where the printer 196 may transfer the document 430 onto a tangible medium as desired by the user.

Figure 7:
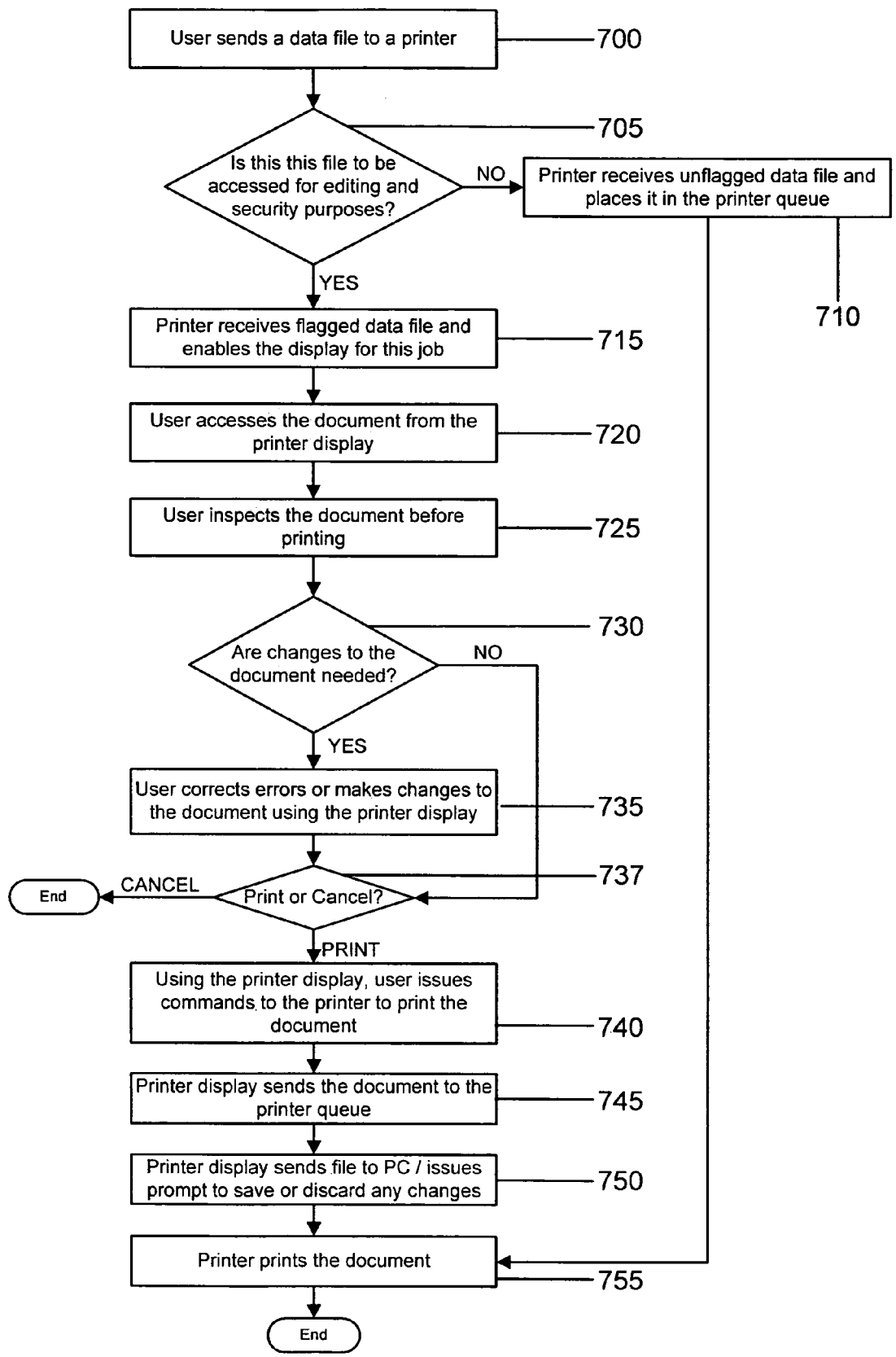
FIG. 7 is a flowchart explaining another embodiment of a control process for printing a document using the printer display.
Figure 8A:
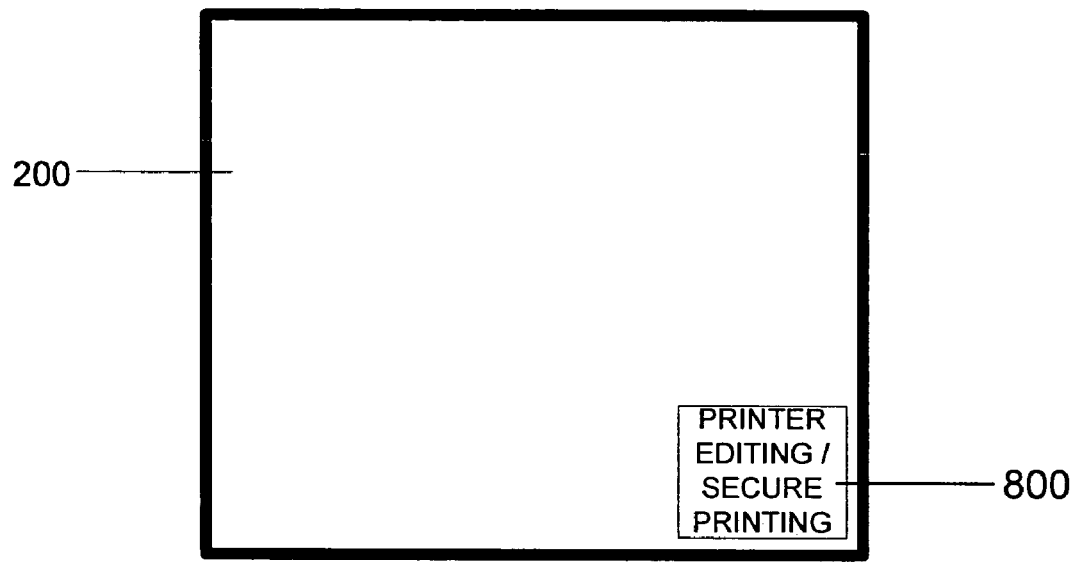
FIGS. 8a and 8b illustrate the control process of FIG. 7 as seen from a user's perspective.
Figure 8B:
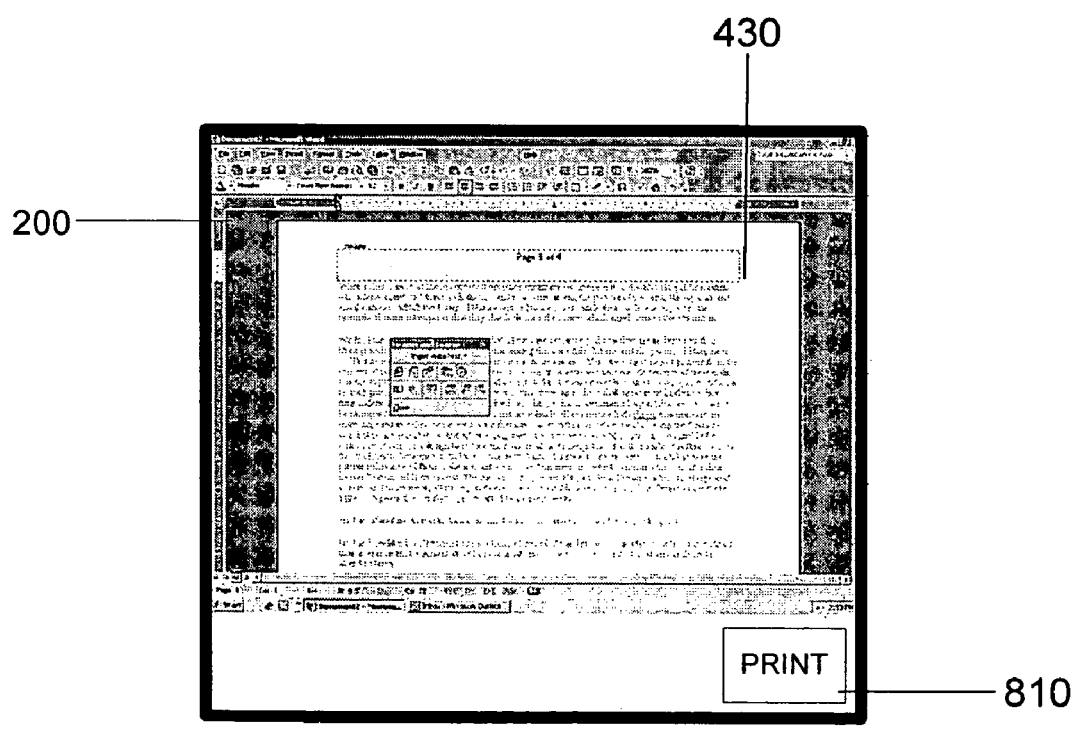

FIGS. 7 and 8a through 8b may illustrate another embodiment for accessing and printing a document from a printer display. At block 700, the user may send a data file or document to a printer 196. At block 705, the printer 196 or an application running on the PC 110 may then prompt the user at the PC 110 to decide whether or not to allow this file to be accessed by the printer GUI 200 for editing and security purposes or to print normally. The user's response may determine the value of a flag in the data file. If the decision at block 705 is yes, at block 715 the printer may receive a flagged data file, the printer 196 may send the file to the printer GUI 200, and the printer GUI 200 may be enabled for this job. If at block 705, the decision is no, at block 710 the printer may receive an unflagged data file, the printer 196 may send the file to the printer queue, and at block 755, the document may print normally. At block 720, to process a flagged file, the user may access the file at the printer 196 on the printer GUI 200. FIG. 8a illustrates an example of a printer GUI 200 with a Printer Editing/Secure Printing button 800. Upon activation of the Printer Editing/Secure Printing button 800, the printer GUI 200 may display the user's file in the printer GUI 200 area as in FIG. 8a. The printer GUI 200 of FIG. 8a through 8b is for explanation purposes only and may display additional information concerning the printer or a particular print job in addition to the Printer Editing/Secure Printing button 800. Also, Printer Editing/Secure Printing 800 initiated from the printer GUI 200 may include a number of authentication steps to restrict access to the file, thus enhancing the security of each print job.

Figure 2A:
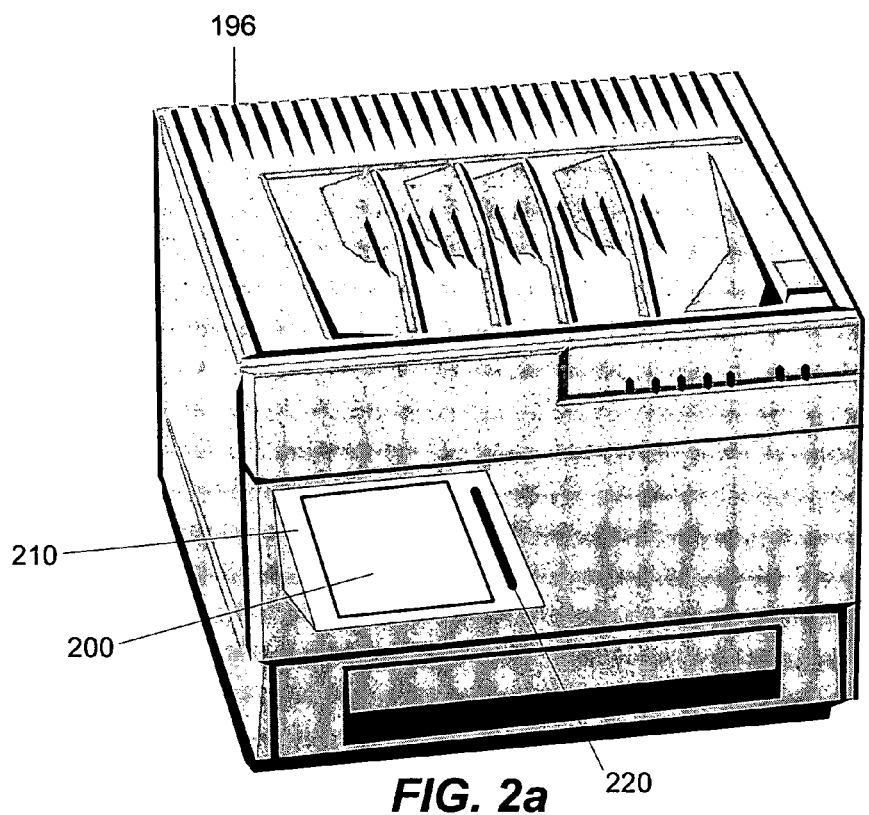
FIGS. 2a and 2b are embodiments of a printer with a user display.
Figure 2B:
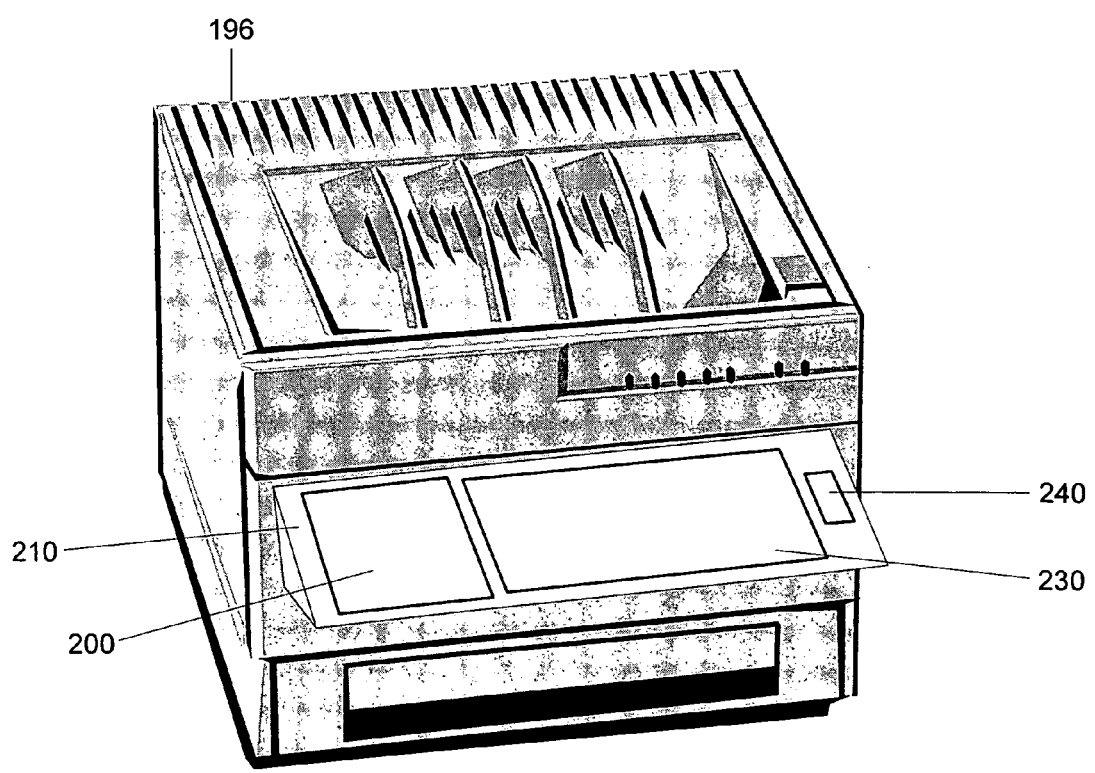

At block 725, the document 430 may be displayed on the printer GUI 200, and the user may inspect it for any further editing or last minute changes. For example, as illustrated in FIG. 8b, the user may recognize that he neglected to include page numbers in the header portion of his document 430. At block 730, the user may decide whether changes are needed. If the decision at block 730 is yes, at block 735 the user may decide that document changes are needed, and correct the errors using a document editing application at the printer GUI 200 using the input devices 220, 230, and 240 or the like as illustrated in FIGS. 2a and 2b. If the decision at block 730 is no, at block 737 the user may print the document from the printer GUI 200 without changes. At block 740, the user may activate the Print button 610 on the printer GUI 200 and the printer GUI 200 may issue commands to the printer 196 to print the document 430. At block 745, the printer GUI 200 may then send the document 430 to the printer queue. At block 750, upon sending to the queue, the printer GUI 200 may send the file back to the original PC 110 and issue a prompt to the user to save or discard any changes made to the document 430 from the printer GUI 200. At block 755, the document may be received by the printer 196 to be delivered through the queue, and the printer 196 may transfer the document 430 onto a tangible medium as desired by the user.

Figure 9:
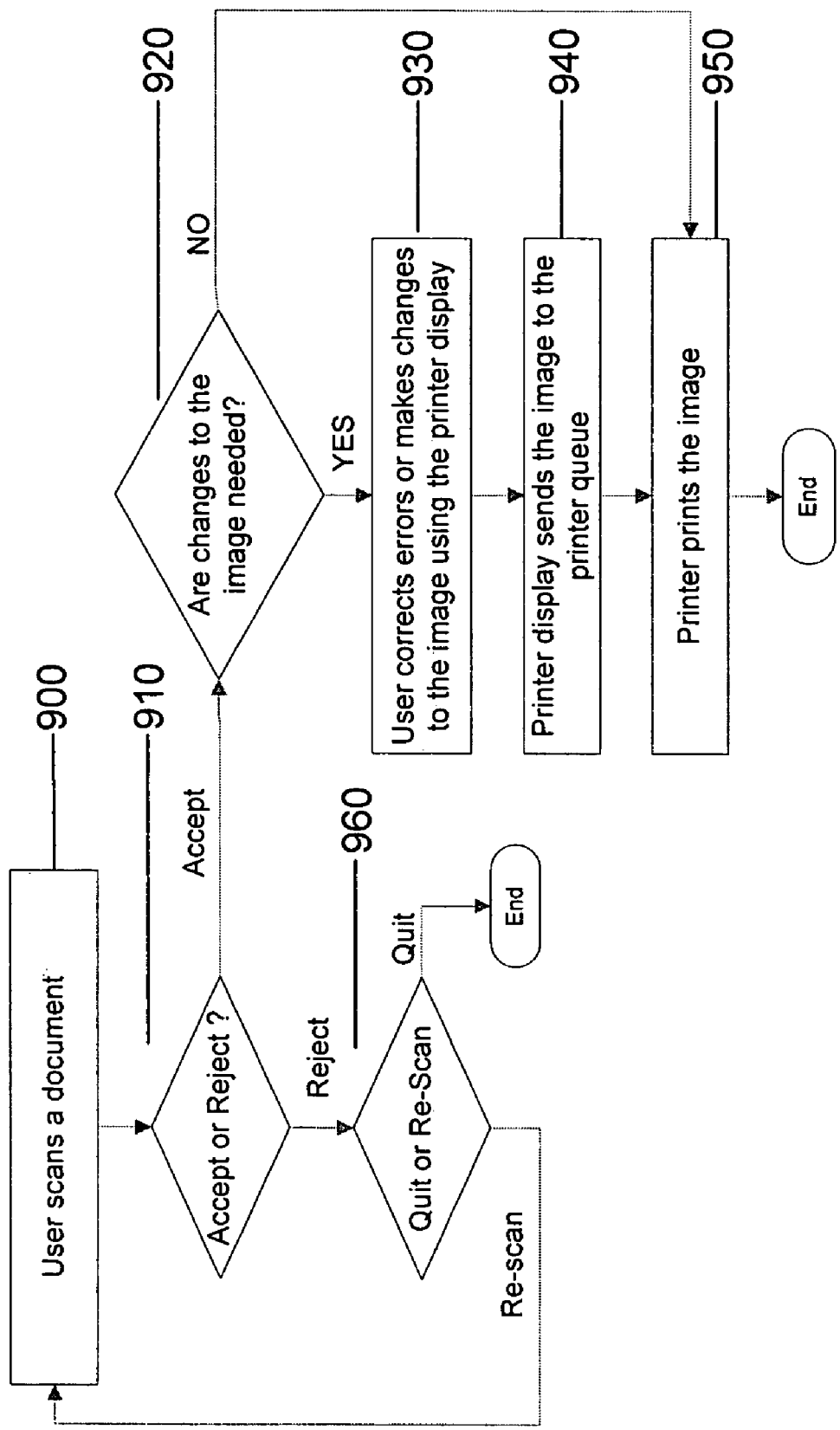
FIG. 9 is a flowchart explaining an embodiment of a control process for scanning and printing a document using the printer display.
Figure 10A:
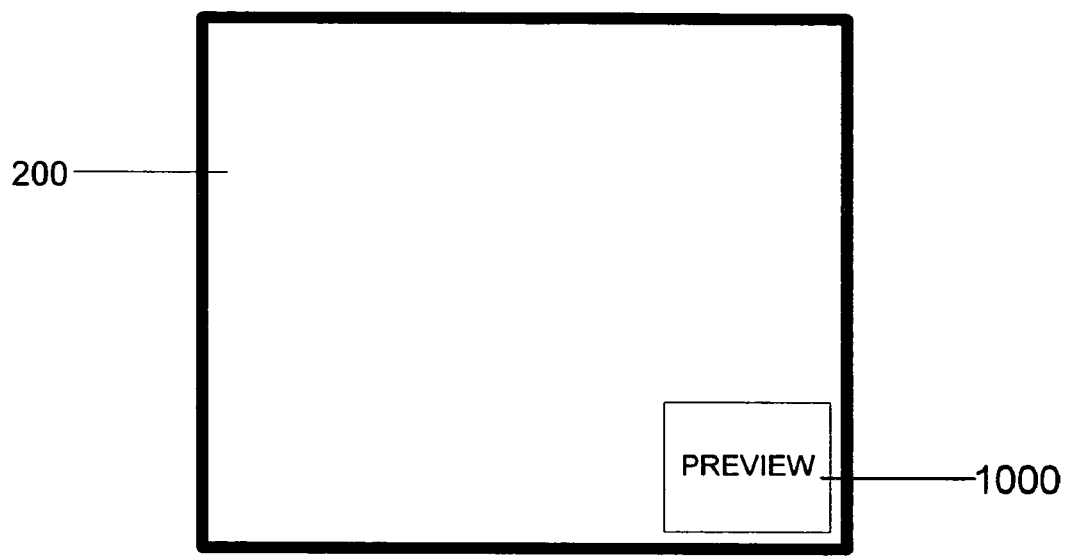
FIGS. 10a and 10b illustrate the control process of FIG. 9 as seen from a user's perspective.
Figure 10B:
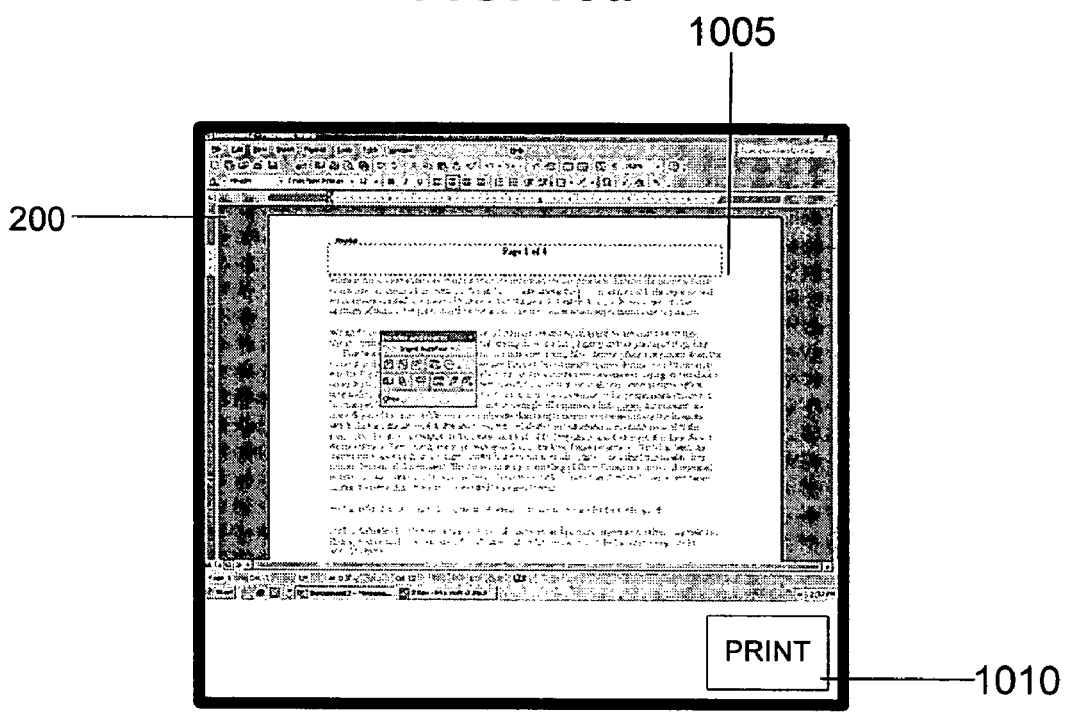

FIGS. 9 and 10a through 10b illustrate using the printer GUI 200 with other capabilities of the associated printer 196. For example, many multi-function printers 196 are capable of a variety of tasks associated with document production and publication. At block 900, using the printer GUI 200, a user may scan a document at the printer 196. The printer GUI 200 may then display a preview button 1000 which allows the user to review the scanned image 1005. At block 910, the user may decide whether to accept or reject the scanned image 1005. If the decision at block 910 is no, at block 960 the user may choose to re-scan the image at block 900 or quit the process at block 960. If the decision at block 910 is yes, at block 920 the printer GUI 200 may prompt the user for changes to the scanned image 1005. If the decision at block 920 is no, at block 950 the printer may print the image. If the decision at block 920 is yes, at block 930 the user may make changes to the image 1005. For example, the user may desire to reduce or enlarge the image, change the image quality, add other images to the scanned image 1005, or forward the image to another user. At block 940, the user may activate the print button 1010 on the printer GUI 200, the printer display may then send the image to the printer queue, and at block 950, the printer may print the desired image.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of printing document data stored on a remote computing device onto a tangible medium comprising:

sending a remote desktop invitation from the remote computing device to a printer, the remote desktop invitation including an internet protocol address of the remote computing device, a netbios machine name of the remote computing device, and a representation of the document data stored on the remote computing device, the printer including a printer display;

accepting the remote desktop invitation;

rendering a remote computing device display on the printer display, the printer display maintaining functions of the remote computing device at the printer display;

accessing the document data stored on the remote computing device at the printer display;

displaying the document data stored on the remote computing device on the printer display;

allowing modification of the document data stored on the remote computing device using functions of the remote computing device from the printer display; and printing the modified document data onto the tangible medium.

2. The method of claim 1, further comprising restricting access to the document data stored on the remote computing device at the printer display.

3. The method of claim 1, wherein the functions of the remote computing device comprise at least one of:
   a document editing function;
   an image editing function;
   an e-mailing function;
   a videoconferencing function;
   a task calendar function; and
   a media player function.

4. The method of claim 1, further comprising retrieving the data from the remote computing device using the representation.

5. The method of claim 1, wherein the functions of the remote computing device comprise at least one of:
   a word processing function;
   an e-mailing function;
   a videoconferencing function;
   an image editing function;
   a task calendar function; and
   a media player function.

6. The method of claim 1, further comprising sending the document data from the printer to a remote computer from the printer display including any modified document data.

7. The method of claim 1, further comprising restricting access to the document data.

8. The method of claim 1, wherein allowing modification of the data stored on the remote computing device using functions of the remote computing device from the printer display includes modifying the data using a stylus at the printer display, the printer including handwriting recognition software.

9. A computer readable storage medium comprising computer executable instructions for printing document data comprising:
   sending a remote desktop invitation from the remote computing device to a printer, the remote desktop invitation including an internet protocol address of the remote computing device, a netbios machine name of the remote computing device, and a representation of the document data stored on the remote computing device, the printer including a printer display;
   accepting the remote desktop invitation;
   rendering a remote computing device display on the printer display, the printer display maintaining functions of the remote computing device at the printer display;
   accessing the document data stored on the remote computing device at the printer display;
   displaying the document data stored on the remote computing device on the printer display;
   allowing modification of the document data stored on the remote computing device using functions of the remote computing device from the printer display; and
   printing the modified document data onto a tangible medium.

10. The computer readable storage medium of claim 9, further comprising retrieving the document data from the remote computing device.

11. The computer readable storage medium of claim 9, wherein the functions of the remote computing device comprise at least one of:
   a document editing function;
   an image editing function;
   an e-mailing function;
   a videoconferencing function;
   a task calendar function; and
   a media player function.

12. The computer readable storage medium of claim 9, further comprising sending the document data from the printer to a remote computer from the printer display.

13. The computer readable storage medium of claim 9, further comprising restricting access to the document data.

14. The computer readable storage medium of claim 9, wherein allowing modification of the document data stored on the remote computing device using functions of the remote computing device from the printer display includes modifying the document data using a stylus at the printer display, the printer including handwriting recognition software.

15. A printer apparatus for printing a document comprising:
   a remote desktop invitation program module for receiving a remote desktop invitation from a remote computing device, the remote desktop invitation including an internet protocol address of the remote computing device, a netbios machine name of the remote computing device, and a representation of the document data stored on the remote computing device;
   a printer display;
   a rendering program module for rendering a remote computing device display on the printer display, the printer display maintaining functions of the remote computing device at the printer display;
   a display module for displaying the document data stored on the remote computing device on the printer display;
   an input device including a stylus or a keyboard;
   a data modification program module for modifying the document data stored on the remote computing device using the data input device and functions of the remote computing device from the printer display; and
   a print program module for printing the modified document data onto a tangible medium.

16. The printer apparatus of claim 15, further comprising a retrieving program module for retrieving the document data from the remote computing device.

17. The printer apparatus of claim 15, wherein the functions of the remote computing device comprise at least one of:
   a document editing function;
   an image editing function;
   an e-mailing function;
   a videoconferencing function;
   a task calendar function; and
   a media player function.

18. The printer apparatus of claim 15, further comprising a sending program module for sending the document data from the printer to a remote computer from the printer display.

19. The printer apparatus of claim 15, further comprising a security module for restricting access to the document data.

20. The printer apparatus of claim 15, further comprising an input module including one or more of a stylus and a keyboard, wherein the data modification program module is configured to modify the document data using one or more of the stylus and the keyboard.

* * * * *